(12) United States Patent
Juhng et al.

(10) Patent No.: US 10,256,044 B2
(45) Date of Patent: Apr. 9, 2019

(54) METHOD OF MANUFACTURING MULTILAYER CERAMIC ELECTRONIC COMPONENT

(71) Applicant: SAMSUNG ELECTRO-MECHANICS CO., LTD., Suwon-si, Gyeonggi-do (KR)

(72) Inventors: Bong Jun Juhng, Suwon-si (KR); Doo Young Kim, Suwon-si (KR); Ki Pyo Hong, Suwon-si (KR); You Na Kim, Suwon-si (KR); Hye Young Choi, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/401,625

(22) Filed: Jan. 9, 2017

(65) Prior Publication Data
US 2017/0301469 A1    Oct. 19, 2017

(30) Foreign Application Priority Data
Apr. 19, 2016  (KR) .................... 10-2016-0047754

(51) Int. Cl.
| H01G 4/30 | (2006.01) |
| H01G 4/248 | (2006.01) |
| H01G 13/00 | (2013.01) |
| H01G 4/232 | (2006.01) |
| H01G 4/012 | (2006.01) |
| H01G 4/12 | (2006.01) |

(52) U.S. Cl.
CPC ............... *H01G 4/30* (2013.01); *H01G 4/232* (2013.01); *H01G 4/248* (2013.01); *H01G 13/006* (2013.01); *H01G 4/012* (2013.01); *H01G 4/12* (2013.01)

(58) Field of Classification Search
CPC ........ H01G 13/006; H01G 4/012; H01G 4/12; H01G 4/232; H01G 4/248; H01G 4/30
See application file for complete search history.

(56) References Cited

U.S. PATENT DOCUMENTS

| 4,771,520 A * | 9/1988 | Tanaka ............. H01G 4/30 29/25.42 |
| 5,261,986 A * | 11/1993 | Kawabata ............. B28B 3/024 156/235 |
| 8,584,332 B2 * | 11/2013 | Matsui ............. H01G 4/30 29/25.41 |

(Continued)

FOREIGN PATENT DOCUMENTS

| KR | 10-2005-0040159 A | 5/2005 |
| KR | 10-2007-0077726 A | 7/2007 |

(Continued)

*Primary Examiner* — Minh Trinh
(74) *Attorney, Agent, or Firm* — Morgan Lewis & Bockius LLP

(57) ABSTRACT

A method of manufacturing a multilayer ceramic electronic component includes forming external electrodes on end surfaces of a ceramic body, and more particularly, to forming external electrodes by attaching a sheet for forming an external electrode on a ceramic body. A multilayer ceramic electronic component thus formed has external electrodes with a thin and uniform thickness.

13 Claims, 9 Drawing Sheets

(56) References Cited

U.S. PATENT DOCUMENTS

| | | | | |
|---|---|---|---|---|
| 8,795,454 B2* | 8/2014 | Matsui | ............. | H01G 4/12 |
| | | | | 156/232 |
| 8,943,680 B2* | 2/2015 | Ogata | ............. | H01G 4/232 |
| | | | | 269/21 |
| 9,240,333 B2* | 1/2016 | Matsui | ............. | H01G 4/12 |
| 10,128,048 B2* | 11/2018 | Park | ............. | H01G 4/30 |
| 2007/0227649 A1* | 10/2007 | Onodera | ............. | H01C 17/006 |
| | | | | 156/230 |
| 2010/0146778 A1* | 6/2010 | Dooka | ............. | H01G 4/232 |
| | | | | 29/832 |
| 2011/0266040 A1 | 11/2011 | Kim et al. | | |
| 2015/0049412 A1 | 2/2015 | Kim et al. | | |
| 2017/0301469 A1* | 10/2017 | Juhng | ............. | H01G 4/232 |

FOREIGN PATENT DOCUMENTS

| | | |
|---|---|---|
| KR | 10-2011-0122008 A | 11/2011 |
| KR | 10-1444616 B1 | 9/2014 |

\* cited by examiner

METHOD OF MANUFACTURING MULTILAYER CERAMIC ELECTRONIC COMPONENT

CROSS-REFERENCE TO RELATED APPLICATION(S)

This application claims benefit of priority to Korean Patent Application No. 10-2016-0047754 filed on Apr. 19, 2016 in the Korean Intellectual Property Office, the disclosure of which is incorporated herein by reference in its entirety.

BACKGROUND

1. Field

The present disclosure relates to a method of manufacturing a multilayer ceramic electronic component and to a multilayer ceramic electronic component.

2. Description Of Related Art

In accordance with a recent trend for the miniaturization of electronic products, multilayer ceramic electronic components have been required to have a small size and high capacitance.

Various methods have been attempted to decrease the thickness of dielectric layers and internal electrodes and increase the number of dielectric layers and internal electrodes in multilayer ceramic electronic components. Multilayer ceramic electronic components in which the thickness of dielectric layers are decreased and the number of stacked dielectric layers are increased have been recently manufactured.

As external electrodes have been required to have a decreased thickness, a problem in which a plating solution permeates into a chip through the thin portions of the external electrodes may occur, such that it is technically difficult to miniaturize the multilayer ceramic electronic component.

Where the external electrodes have non-uniform shapes, there is an increased risk that the plating solution will permeate through thin portions of the external electrodes, such that a problem may occur in terms of securing reliability.

External electrodes formed using an existing dipping method, or the like, may be formed on head surfaces corresponding to end surfaces of a ceramic body in a length direction and on four surfaces (hereinafter, referred to as "band surfaces") contacting the head surfaces. In such a case, it may be difficult to uniformly apply a paste for forming the external electrode due to dispersion in the body and fluidity and viscosity of the paste, such that there may be differences in the thickness of the applied paste.

The plating solution may permeate through a portion of an external electrode where the paste is thinly applied due to a decrease in density of the portion, such that reliability is reduced. In addition, glass beading or blisters, where glass is exposed to a surface, may be generated where the paste is thickly applied, should the thickness of the plating layer be increased to solve a plating defect and a shape defect.

When the thickness of the applied paste is thin and uniform, a formation area of the internal electrodes may be increased, such that capacitance may be significantly increased as compared to an existing capacitor having the same size.

SUMMARY

An aspect of the present disclosure may provide a high capacitance multilayer ceramic electronic component where an external electrode has a thin and uniform thickness, and a method of manufacturing the same.

According to an aspect of the present disclosure, a method of manufacturing a multilayer ceramic electronic component may include: preparing an elastic punching material and a member having a sheet for forming an external electrode above the elastic punching material; stacking ceramic sheets, on which internal electrode patterns are formed, to form a ceramic body including internal electrodes disposed to face each other with respective dielectric layers interposed therebetween; pressing and closely adhering the ceramic body to the sheet for forming an external electrode, to attach the sheet for forming an external electrode to the ceramic body; and forming an external electrode by cutting the sheet for forming an external electrode using the elastic punching material.

According to another aspect of the present disclosure, a method of manufacturing a multilayer ceramic electronic component may include: attaching an elastic pressing material to a first surface plate; preparing a member having a sheet for forming an external electrode above the elastic pressing material; stacking ceramic sheets on which internal electrode patterns are formed, to form a ceramic body including internal electrodes disposed to face each other with respective dielectric layers interposed therebetween; pressing and closely adhering the ceramic body to the sheet for forming an external electrode, to attach the sheet for forming an external electrode to the ceramic body; heating the surface plate to extend the sheet for forming an external electrode to band portions of the ceramic body; preparing a member having an elastic punching material above a second surface plate; and pressing and closely adhering the ceramic body having the sheet for forming an external electrode on the elastic punching material to cut the sheet for forming an external electrode, thereby forming an external electrode on an outer surfaces of the ceramic body.

According to another aspect of the present disclosure, a multilayer ceramic electronic component may include: a ceramic body including dielectric layers and internal electrodes stacked and alternately exposed to respective end surfaces of the ceramic body with dielectric layers interposed therebetween; external electrodes respectively disposed on end surfaces of the ceramic body in a length direction and up to corner portions of the ceramic body; and one or more plating layers disposed on each of the external electrodes wherein, $0.8 \leq T2/T1 \leq 1.2$ in which $T1$ is a thickness of each of the external electrodes in a central region of the ceramic body in the thickness direction and $T2$ is a thickness of each of the external electrodes at a point at which an uppermost internal electrode in the thickness direction is positioned.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1A:
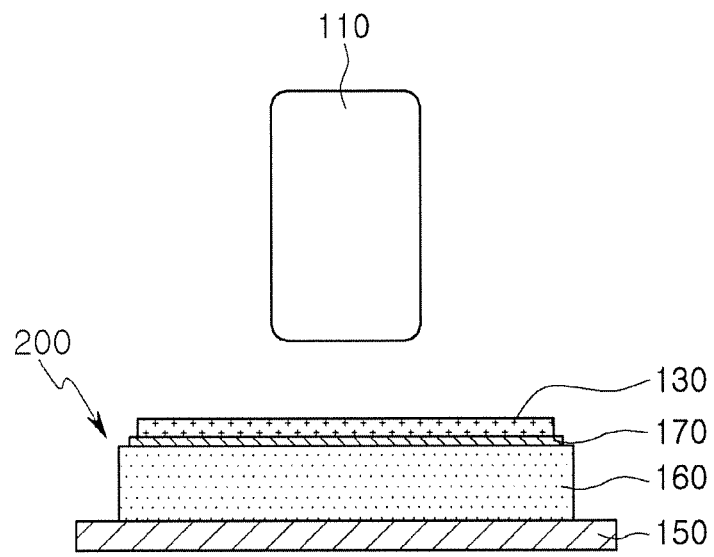
FIGS. 1A through 1C are views illustrating a process of forming an external electrode of a multilayer ceramic electronic component according to an exemplary embodiment in the present disclosure.

Hereinafter, exemplary embodiments of the present disclosure will be described in detail with reference to the accompanying drawings.

Directions of a hexahedron will be defined in order to clearly describe exemplary embodiments in the present disclosure. L, W, and T illustrated in the drawings refer to a length direction, a width direction, and a thickness direction, respectively. Here, the thickness direction may be the same as a stacking direction in which dielectric layers are stacked.

Method of Manufacturing Multilayer Ceramic Electronic Component

Figure 1B:
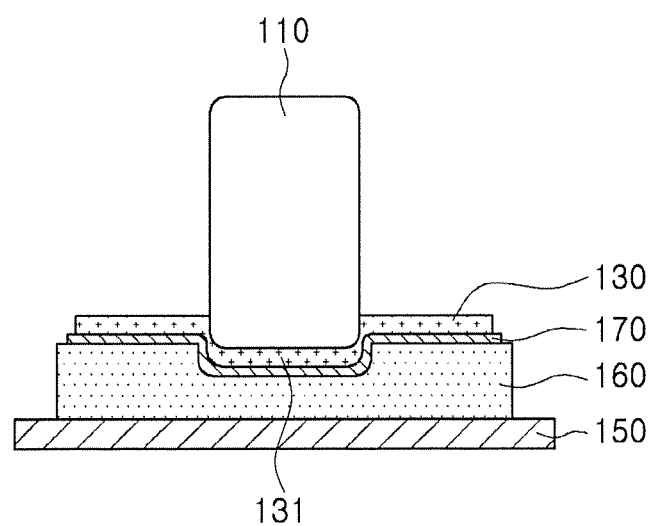
Figure 1C:
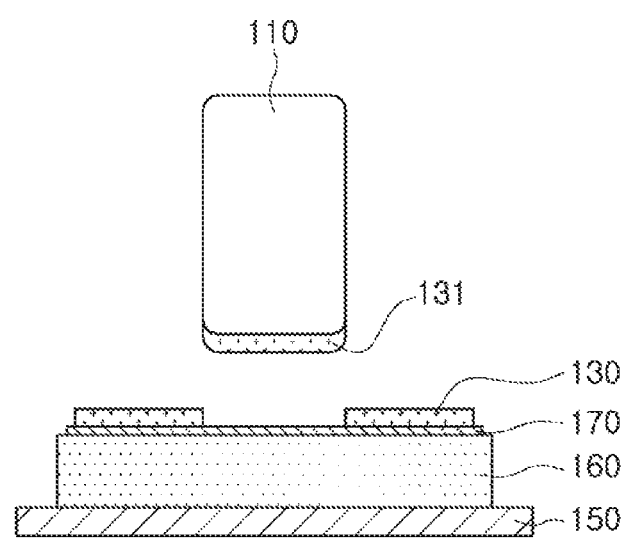

FIGS. 1A through 1C are views illustrating a process of forming an external electrode of a multilayer ceramic electronic component according to an exemplary embodiment in the present disclosure.

Referring to FIGS. 1A through 1C, a method of manufacturing a multilayer ceramic electronic component according to an exemplary embodiment in the present disclosure may include attaching an elastic punching material 160 to a surface plate 150 and preparing a member having a sheet 130 for forming an external electrode above the elastic punching material 160. Ceramic sheets on which internal electrode patterns are formed can be stacked to form a ceramic body 110 that includes internal electrodes disposed to face each other with respective dielectric layers interposed therebetween. The ceramic body 110 can be pressed and closely adhered to the sheet 130 for forming an external electrode to attach the sheet 130 on the ceramic body 110.

In order to form external electrodes on outer surfaces of the ceramic body 110, the elastic punching material 160 may be attached to the surface plate 150, and the member having the sheet 130 for forming an external electrode may be prepared above the elastic punching material 160.

The method of manufacturing a multilayer ceramic electronic component according to the exemplary embodiment may further include attaching a release film 170 onto the elastic punching material 160 and attaching the sheet 130 for forming an external electrode on the release film 170.

The surface plate 150 may serve as to support a member used to form the external electrodes on the outer surfaces of the ceramic body 110, and may be any material with low thermal deformation, such as a stone surface plate using stone as a raw material.

The elastic punching material 160 may serve to cut the sheet 130 for forming an external electrode attached to the outer surfaces of the ceramic body 110. Therefore, the external electrodes may be formed on both end surfaces of the ceramic body 110 in a length direction of the ceramic body 110, respectively.

The elastic punching material 160 may be any material having elasticity, such as a punching rubber.

The release film 170 may also serve to cut the sheet 130 for forming an external electrode attached to the outer surfaces of the ceramic body 110, and may be a polyethylene terephthalate (PET) film. However, a material of the release film 170 is not limited thereto.

The sheet 130 for forming an external electrode may be a paste for forming an external electrode that is thinly applied and then dried, and may be a green sheet.

In detail, the paste for forming an external electrode may be prepared by mixing a conductive metal selected from the group consisting of copper (Cu), nickel (Ni), palladium (Pd), platinum (Pt), gold (Au), silver (Ag), or lead (Pb), or alloys thereof, a binder, a plasticizer, and a dispersant, and the like, with each other.

The paste for forming an external electrode may be applied depending on a required thickness of the external electrode using a doctor blade casting device, or the like, and then dried to prepare the sheet 130 for forming an external electrode.

A method of forming the external electrodes on the outer surfaces of the ceramic body can be performed by dipping the ceramic body in the paste for forming an external electrode.

However, in a case of forming external electrodes using a dipping method, or the like, the external electrodes are formed on head surfaces corresponding to end surfaces of a ceramic body in the length direction and band surfaces corresponding to four surfaces contacting the head surfaces, and it is difficult to uniformly apply the paste for forming an external electrode due to generation of dispersion in the ceramic body and fluidity and viscosity of the paste, which leads to thickness differences in the applied paste.

A plating solution may permeate through a portion of an external electrode where the paste is thinly applied due to a decrease in density of the portion, such that reliability is reduced. In addition, glass beading or blisters, where glass is exposed to a surface, may be generated in a portion where the paste is thickly applied, should the thickness of the plating layer be increased to solve a plating defect and a shape defect.

According to the exemplary embodiment, the external electrodes may be formed on the outer surfaces of the ceramic body by a sheet transfer method or a pad transfer method rather than the existing dipping method, such that the paste for forming an external electrode may be thinly and uniformly applied.

Therefore, formation areas of the internal electrodes may be increased, such that capacitance may be significantly increased as compared to an existing capacitor having the same size.

Ceramic sheets on which internal electrode patterns are formed may be stacked to forma ceramic body 110. The ceramic body 110 includes internal electrodes disposed to face each other with respective dielectric layers interposed therebetween.

To form the ceramic body 110, a slurry including powder particles such as barium titanate ($BaTiO_3$) powder particles, or the like, may be first applied and dried onto carrier films to prepare a plurality of ceramic sheets, thereby forming dielectric layers.

The ceramic sheets may be manufactured by mixing ceramic powder particles, a binder, and a solvent with each other to prepare a slurry and manufacturing the slurry in a sheet shape having a thickness of several micrometers by a doctor blade method, for example.

Then, a conductive paste including conductive metal powder particles may be prepared. The conductive metal powder particles may be powder particles of nickel (Ni), copper (Cu), palladium (Pd), silver (Ag), lead (Pb), or platinum (Pt), or alloys thereof, may have an average particle size of 0.1 to 0.2μm. The conductive paste may be prepared with 40wt % to 50wt % of the conductive metal powder particles.

The conductive paste for an internal electrode may be applied to the ceramic sheets by a printing method, or the like, to form the internal electrode patterns. A method of printing the conductive paste may be a screen printing method, a gravure printing method, or the like, but is not limited thereto. Two hundred or three hundred ceramic sheets on which the internal electrode patterns are printed may be stacked, pressed, and sintered to manufacture the ceramic body 110.

Referring to FIG. 1B, the ceramic body 110 may be pressed and closely adhered to the sheet 130 for forming an external electrode to attach the sheet 130 on the ceramic body 110.

Referring to FIG. 1C, the sheet 130 for forming an external electrode may be cut by the elastic punching material 160, such that an external electrode 131 may be formed. External electrodes may be formed on both end surfaces of the ceramic body 110 in the length direction of the ceramic body 110, respectively.

Where the release film 170 is attached to the elastic punching material 160, the sheet 130 for forming an external electrode may be cut by the release film 170.

The sheet 130 for forming an external electrode may be cut in corner portions of the ceramic body 110 by the release film 170. Therefore, the external electrodes of the multilayer ceramic capacitor according to the exemplary embodiment may be formed only on end surfaces of the ceramic body in the length direction, respectively, and may be omitted from other surfaces of the ceramic body.

That is, the external electrodes 131 may be formed up to corner portions of the ceramic body 110.

According to the structure described above, the external electrodes 131 may be formed on the head surfaces corresponding to the end surfaces of the ceramic body 110 in the length direction L of the ceramic body 110, and may or may not be formed formed at a size as small as possible on all of the band surfaces corresponding to the four surfaces contacting the head surfaces, such that the external electrodes may be formed at a thin and uniform thickness.

Therefore, formation areas of the internal electrodes may be increased, such that areas in which the internal electrodes overlap each other may be significantly increased, whereby a high capacitance multilayer ceramic capacitor may be implemented.

The external electrodes 131 may be formed on both end surfaces of the ceramic body 110 in the length direction of the ceramic body 110, respectively, by the sheet transfer method or the pad transfer method as opposed to the dipping method.

FIG. 1C illustrates a process of forming one external electrode 131, but a process of forming another external electrode on the other end surface of the ceramic body 110 in the length direction of the ceramic body 110 may be added.

The method of manufacturing a multilayer ceramic electronic component according to the exemplary embodiment may further include forming plating layers on the external electrodes. The plating layers may include nickel plating layers and tin plating layers formed on the nickel plating layers, but are not necessarily limited thereto.

Figure 2A:
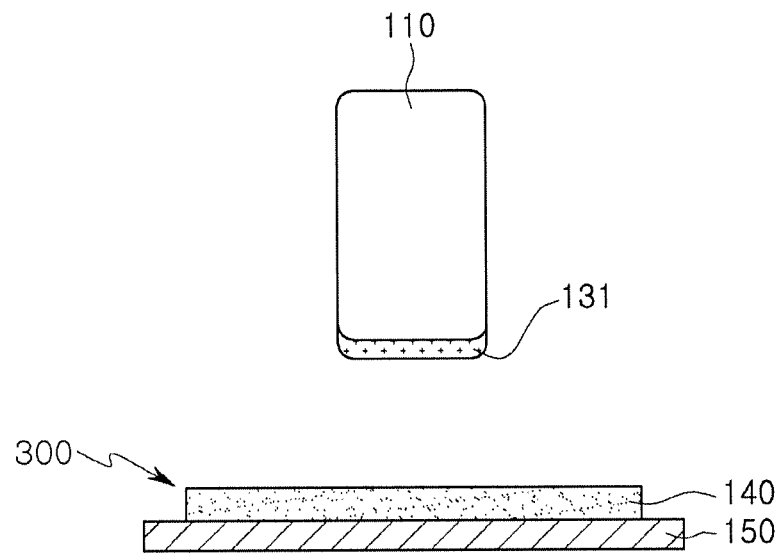
FIGS. 2A through 2C are views illustrating a process of forming an external electrode of a multilayer ceramic electronic component according to another exemplary embodiment in the present disclosure.
Figure 2B:
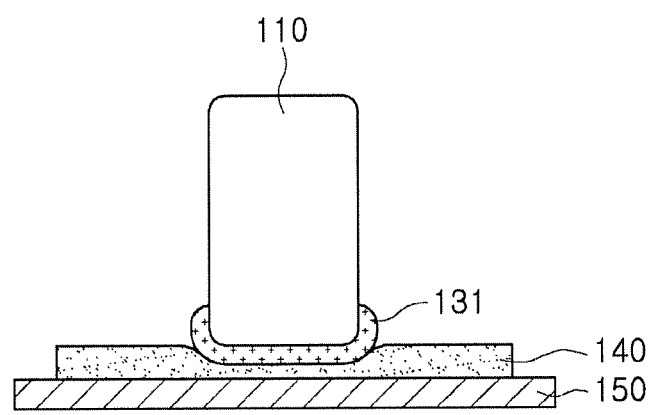
Figure 2C:
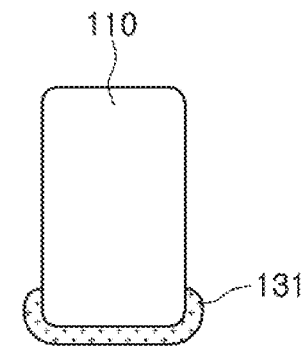
Figure 2C:
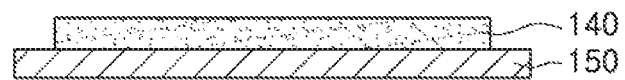

FIGS. 2A through 2C are views illustrating a process of forming an external electrode of a multilayer ceramic electronic component according to another exemplary embodiment in the present disclosure.

Referring to FIGS. 2A through 2C, a method of manufacturing a multilayer ceramic electronic component according to another exemplary embodiment in the present disclosure may further include, after forming the external electrodes 131 on both end surfaces of the ceramic body 110 in the length direction of the ceramic body 110, respectively, preparing a member having an elastic pressing material 140 attached thereto on the surface plate 150 and heating the surface plate 150 to press and closely adhere the ceramic body 110 to the elastic pressing material 140, thereby extending the external electrodes 131 to band portions of the ceramic body 110.

In FIG. 2C, the ceramic body 110 with external electrodes formed on an end surface may be pressed onto the member having the elastic pressing material 140 attached thereto and formed on the surface plate 150 to extend the external electrodes 131 to the band portions of the ceramic body 110.

The surface plate 150 may be heated to increase ductility of the external electrode formed on the end surface of the ceramic body 110, such that the external electrode may extend to the band portions of the ceramic body 110.

In addition, the heated surface plate 150 may increase adhesion between the ceramic body and the external electrodes.

The elastic pressing material 140 may be any material having elasticity, such as a pressing rubber.

The pressing rubber may have elasticity smaller than that of the punching rubber, the elastic punching material 160.

According to the exemplary embodiment, when a thickness of each of the external electrodes 131 in a central region of the ceramic body 110 in the thickness direction of the ceramic body 110 is T1 and a thickness of each of the external electrodes 131 at a point at which the uppermost of the internal electrodes in the thickness direction is positioned is T2, $0.8 \leq T2/T1 \leq 1.2$.

The thickness T1 refers to the length that a virtual line drawn from a central point of the ceramic body 110 in the thickness direction and traveling in the length direction overlaps the external electrode.

Likewise, the thickness T2 refers to the length that a virtual line drawn from a position of an uppermost internal electrode in the thickness direction and traveling in the length direction overlaps the external electrode.

The ratio of thicknesses T2 and T1 can satisfy the range $0.8 \leq T2/T1 \leq 1.2$ to reduce a deviation between the thickness T1 of each of the electrodes 131 in the central region of the ceramic body 110 in the thickness direction of the ceramic body 110 and the thickness T2 of each of the external electrodes 131 at the point at which the uppermost internal electrode is positioned, whereby deteriorations of reliability may be prevented.

Where T2/T1 is less than 0.8 or exceeds 1.2, a deviation between thicknesses of the external electrodes is large, such that a plating solution may permeate into a thin portion of the external electrodes, thereby deteriorating reliability.

According to the exemplary embodiment, when a thickness of each of the external electrodes 131 in corner portions of the ceramic body 110 is T3, $0.4 \leq T3/T1 \leq 1.0$.

The thickness T3 refers to a thickness of each of the external electrodes 131 formed on corner regions of the ceramic body 110.

The ratio of thicknesses T3 and T1 can satisfy the range $0.4 \leq T3/T1 \leq 1.0$ to reduce a deviation between the thickness T1 of each of the electrodes 131 in the central region of the ceramic body 110 in the thickness direction of the ceramic body 110 and the thickness T3 of each of the external electrodes 131 in the corner portions of the ceramic body 110, whereby deteriorations of reliability may be prevented.

Where T3/T1 is less than 0.4 or exceeds 1.0, a deviation between thicknesses of the external electrodes is large, such that a plating solution may permeate into a thin portion of the external electrodes, thereby deteriorating reliability.

FIGS. 3A through 3F are views illustrating a process of forming an external electrode of a multilayer ceramic electronic component according to another exemplary embodiment in the present disclosure.

Referring to FIGS. 3A through 3F, a method of manufacturing a multilayer ceramic electronic component according to another exemplary embodiment in the present disclosure may include attaching an elastic pressing material 140 to a surface plate 150 and preparing a member having a sheet 130 for forming an external electrode attached thereto on the elastic pressing material 140. Ceramic sheets on which internal electrode patterns are formed can be stacked to form a ceramic body 110 that includes internal electrodes disposed to face each other with respective dielectric layers interposed therebetween. The ceramic body 110 can be pressed and closely adhered to the sheet 130 for forming an external electrode to attach the sheet 130 on the ceramic body 110. The surface plate 150 can be heated to extend the sheet 130 for forming an external electrode to band portions of the ceramic body 110. A member having an elastic punching material 160 attached thereto can be prepared on the surface plate 150, and ceramic body 110 with sheet 130 can be pressed and closely adhered onto the elastic punching material 160 to cut the sheet 130 for forming an external electrode, thereby forming external electrodes 131 on outer surfaces of the ceramic body 110.

Figure 3A:
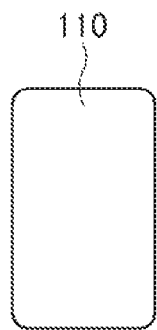
FIGS. 3A through 3F are views illustrating a process of forming an external electrode of a multilayer ceramic electronic component according to another exemplary embodiment in the present disclosure.
Figure 3A:
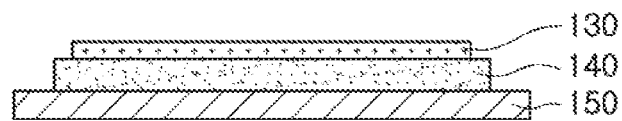

Referring to FIG. 3A, the elastic pressing material 140 may be attached to the surface plate 150, and the member having the sheet 130 for forming an external electrode attached thereto may be prepared on the elastic pressing material 140.

Since the surface plate 150, the elastic pressing material 140, and the sheet 130 for forming an external electrode have been described above, a description thereof will be omitted, and contents overlapping those described above are omitted.

The ceramic sheets on which the internal electrode patterns are formed may be stacked to form the ceramic body 110 including internal electrodes disposed to face each other with respective dielectric layers interposed therebetween.

Figure 3B:
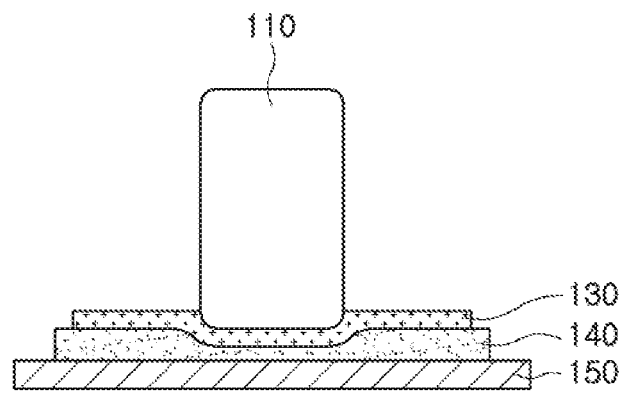

Referring to FIG. 3B, the ceramic body 110 may be pressed and closely adhered to the sheet 130 for forming an external electrode to attach the sheet 130 on the ceramic body 110.

In this process, the surface plate 150 may be heated to extend the sheet 130 to the band portions of the ceramic body 110.

Figure 3C:
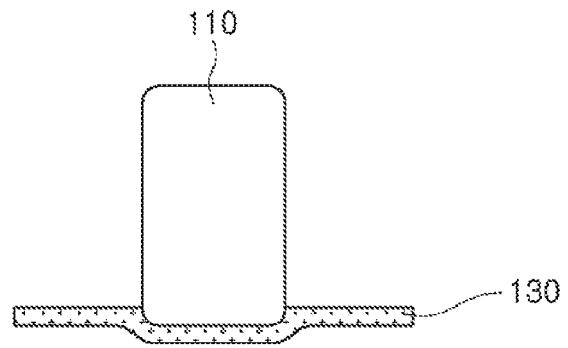
Figure 3C:
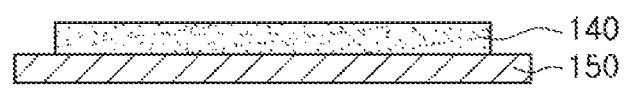

When the ceramic body 110 is again detached from a member including the surface plate, the pressing elastic member 140 may be restored to its original position, and the sheet 130 for forming an external electrode may be disposed on one end surface of the ceramic body 110 in the length direction of the ceramic body 110 so as to extend to the band portions of the ceramic body 110, as illustrated in FIG. 3C.

Figure 3D:
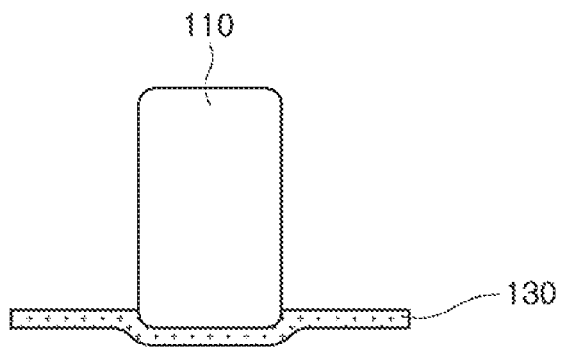
Figure 3D:
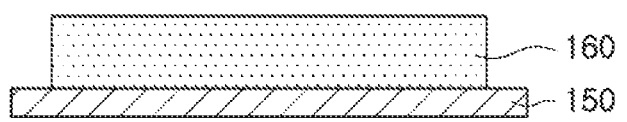
Figure 3E:
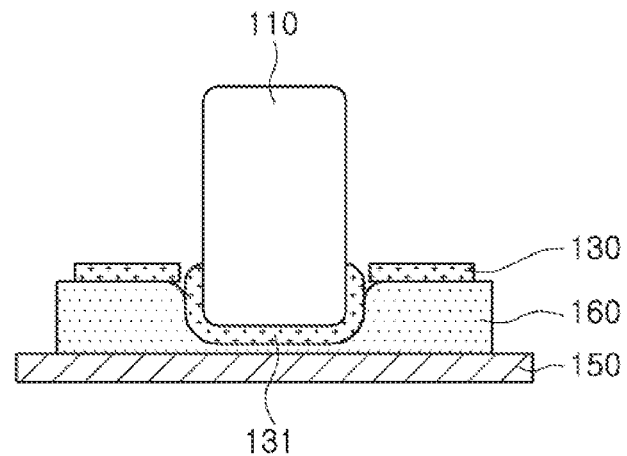

Referring to FIG. 3D, the member having the elastic punching material 160 attached thereto may be prepared on the surface plate 150. As illustrated in FIG. 3E, the ceramic body 110 with sheet 130 can be pressed and closely adhered onto the elastic punching material 160 to cut the sheet 130.

Figure 3F:
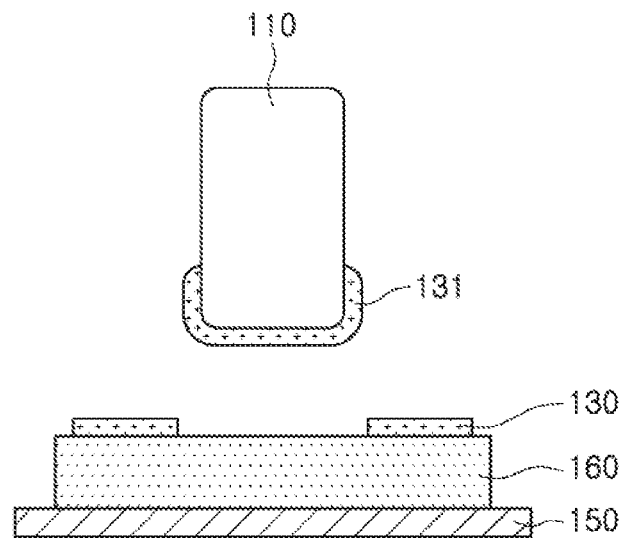

When the ceramic body 110 is again detached from a member including the surface plate, the punching elastic member 160 may be restored to its original position, and the sheet 130 for forming an external electrode may be extended to the band portions of the ceramic body 110 on one end surface of the ceramic body 110 in the length direction of the ceramic body 110 to form the external electrode 131, as illustrated in FIG. 3F.

A process of forming one external electrode 131 is illustrated in FIGS. 3A through 3F, but another external electrode can be formed on the other end surface of the ceramic body 110 in the length direction of the ceramic body 110.

The method of manufacturing a multilayer ceramic electronic component according to the exemplary embodiment may further include forming plating layers on the external electrodes. The plating layers can include nickel plating layers and tin plating layers formed on the nickel plating layers, but are not necessarily limited thereto.

Multilayer Ceramic Electronic Component

A multilayer ceramic electronic component according to an exemplary embodiment in the present disclosure, particularly a multilayer ceramic capacitor, will hereinafter be described. However, the multilayer ceramic electronic component according to the present disclosure is not limited thereto.

Figure 4:
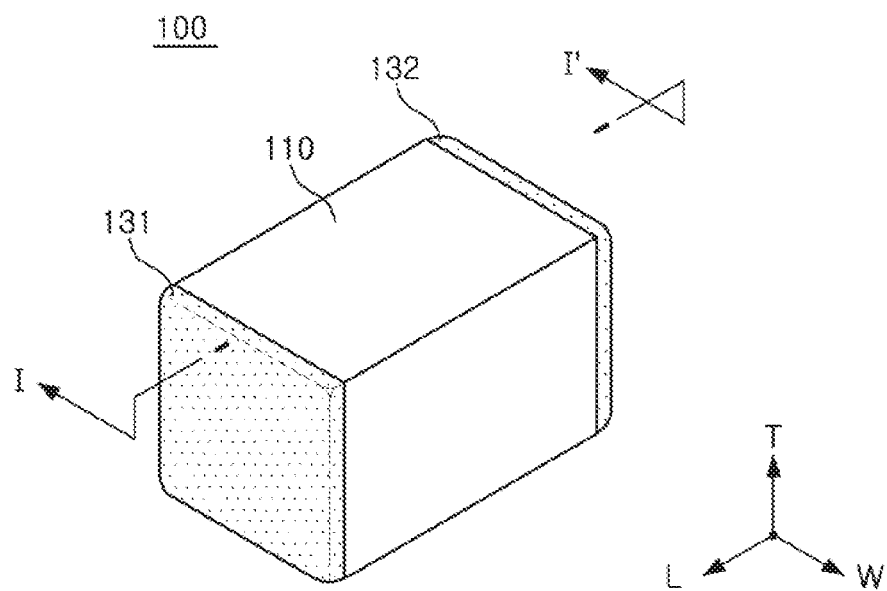
FIG. 4 is a perspective view of a multilayer ceramic electronic component according to another exemplary embodiment in the present disclosure.
Figure 5:
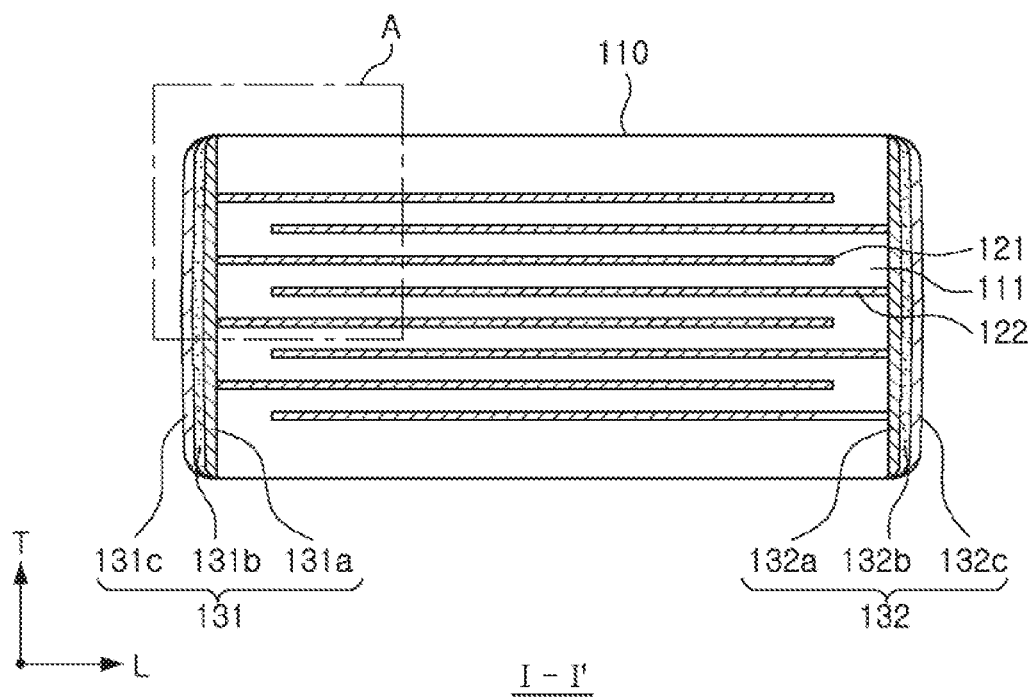
FIG. 5 is a cross-sectional view taken along line I-I' of FIG. 4.
Figure 6:
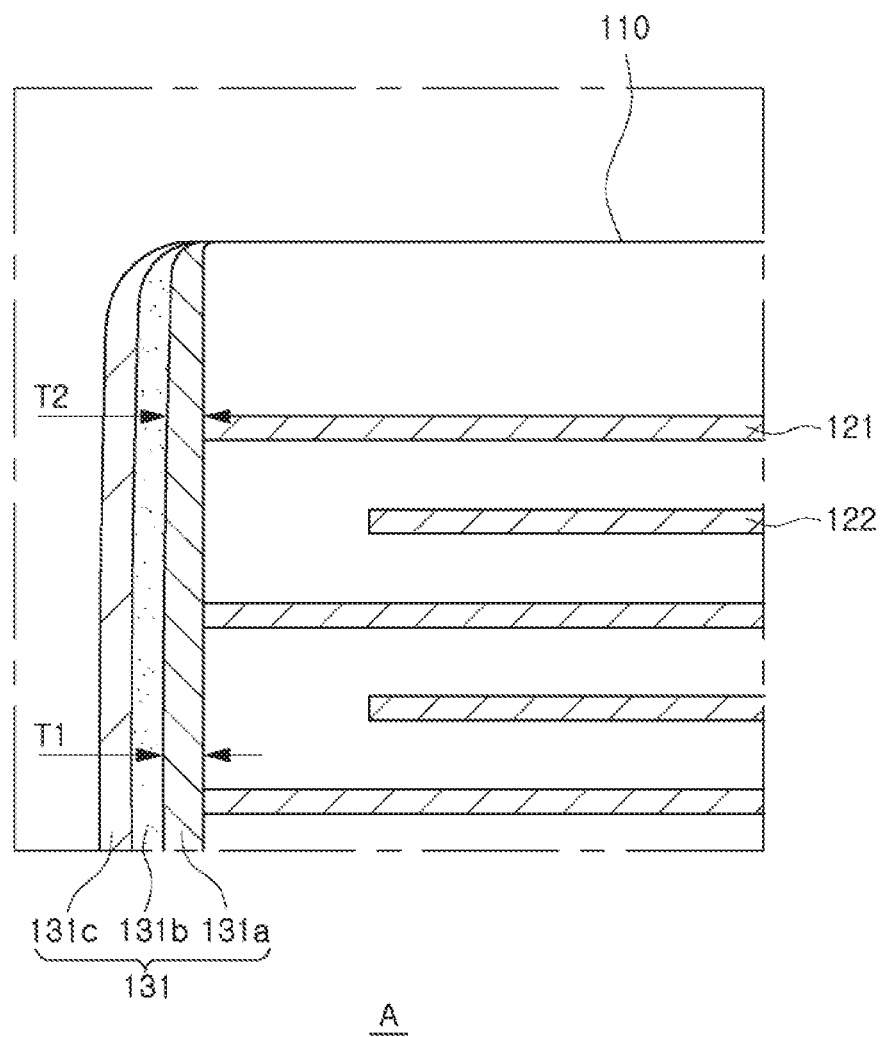
FIG. 6 is an enlarged view of region A of FIG. 5.

FIG. 4 is a perspective view of a multilayer ceramic electronic component according to another exemplary embodiment in the present disclosure, FIG. 5 is a cross-sectional view taken along line I-I' of FIG. 4, and FIG. 6 is an enlarged view of region A of FIG. 5.

Referring to FIGS. 4 through 6, a multilayer ceramic electronic component 100 according to an exemplary embodiment in the present disclosure may include a ceramic body 110, including internal electrodes 121 and 122, and external electrodes 131 and 132.

The ceramic body 110 may be in the form of a hexahedron having both end surfaces in a length direction L, both side surfaces in a width direction W, and both side surfaces in a thickness direction T. The ceramic body 110 may be formed by stacking a plurality of dielectric layers 111 in the thickness direction T and then sintering the plurality of dielectric layers 111. The shape and dimensions of the ceramic body 110 and the number of stacked dielectric layers 111 are not limited to those of the example illustrated in the present exemplary embodiment.

The plurality of dielectric layers 111 forming the ceramic body 110 may be in a sintered state, and adjacent dielectric layers 111 may be integrated with each other so that boundaries therebetween are not readily apparent without using a scanning electron microscope (SEM).

The dielectric layer 111 may have a thickness arbitrarily changed in accordance with a capacitance design of the multilayer ceramic electronic component 100, and may include ceramic powder particles having a high dielectric constant, such as barium titanate ($BaTiO_3$) based powder particles or strontium titanate ($SrTiO_3$) based powder particles. However, a material of the dielectric layer 111 according to the present disclosure is not limited thereto. In addition, various ceramic additives, organic solvents, plasticizers, binders, dispersants, and the like, may be added into the ceramic powder particles according to an object of the present disclosure.

An average particle size of the ceramic powder particles used to form the dielectric layer 111 is not particularly limited, but may be controlled in order to accomplish an object of the present disclosure. For example, the average particle size of the ceramic powder particles used to form the dielectric layer 111 may be controlled to be 400 nm or less.

The internal electrodes 121 and 122 may include a plurality of first internal electrodes 121 and a plurality of second internal electrodes 122, provided in pairs and having different polarities, and may be formed at a predetermined thickness with each of the plurality of dielectric layers 111 stacked in the thickness direction T of the ceramic body 110 interposed therebetween.

The first internal electrodes 121 and the second internal electrodes 122 maybe formed to be alternately exposed to respective end surface of the ceramic body 110 in the length direction L of the ceramic body 110 by printing a conductive paste including a conductive metal, and may be electrically insulated from each other by respective dielectric layers 111 disposed therebetween.

The first and second internal electrodes 121 and 122 may be electrically connected to the respective first and second external electrodes 131 and 132 formed on respective end surfaces of the ceramic body 110 in the length direction L of the ceramic body 110. The electrical connections may be through the portions alternately exposed to respective end surfaces of the ceramic body 110 in the length direction of the ceramic body 110.

When voltages are applied to the first and second external electrodes 131 and 132, electric charges may accumulate between first and second internal electrodes 121 and 122 facing each other. In this case, capacitance of the multilayer ceramic capacitor 100 may be in proportion to an area of a region in which the first and second internal electrodes 121 and 122 overlap each other.

When the area of the region in which the first and second internal electrodes 121 and 122 overlap each other is significantly increased, capacitance may be significantly increased even in a capacitor having the same size.

According to the exemplary embodiment, since the external electrodes are thin with uniform thickness, an area in which the internal electrodes overlap each other may be significantly increased, such that a high capacitance multilayer ceramic capacitor may be implemented.

The widths of the first and second internal electrodes 121 and 122 may be determined depending on an intended use of the multilayer ceramic capacitor. For example, the widths of the first and second internal electrodes 121 and 122 may be determined to be in a range of 0.2 to 1.0µm in consideration of a size of the ceramic body 110. However, the widths of the first and second internal electrodes 121 and 122 according to the present disclosure are not limited thereto.

The conductive metal included in the conductive paste for the first and second internal electrodes 121 and 122 may be nickel (Ni), copper (Cu), palladium (Pd), silver (Ag), lead (Pb), or platinum (Pt) or alloys thereof. However, the conductive metal according to the present disclosure is not limited thereto.

The external electrodes 131 and 132 may include a first external electrode 131 and a second external electrode 132 respectively disposed on outer surfaces of the ceramic body 110.

The external electrodes 131 and 132 may be respectively disposed only on end surfaces of the ceramic body 110 in the length direction of the ceramic body 110.

The external electrodes 131 and 132 may be disposed on respective end surfaces of the ceramic body 110 in the length direction up to corresponding corner portions of the ceramic body 110.

The external electrodes 131 and 132 may include first electrode layers 131a and 132a and plating layers 131b, 131c, 132b, and 132c, as illustrated in FIG. 5.

The first external electrode 131 may include the first electrode layer 131a disposed on one surface of the ceramic body 110 in the length direction L of the ceramic body 110, and the plating layers 131b and 131c disposed on the first electrode layer 131a.

The second external electrode 132 may include the first electrode layer 132a disposed on the other surface of the ceramic body 110 in the length direction L of the ceramic body 110, and the plating layers 132b and 132c disposed on the first electrode layer 132a.

In the related art, the external electrode is formed by dipping the ceramic body 110 in a paste that includes a metal component.

Where the external electrode is formed by the dipping method, the paste for the external electrode is not uniformly applied due to fluidity and viscosity of the paste, which generates a difference in thickness between a central portion and a corner portion of the external electrode.

Where the thickness of the external electrode is not uniform, glass beading or blister is generated in the central portion where the applied paste is thick, causing a plating defect and/or a shape defect, and the corner portion where the applied paste is thin is vulnerable to permeation of a plating solution, such that reliability is deteriorated.

When the paste thickness is increased at the corner portion to avoid permeation of the plating solution, the paste thickness of the central portion is increased, which hampers the ability to increase the size of the ceramic capacitor to increase capacitance.

Therefore, in the exemplary embodiment in the present disclosure, the first electrode layers 131a and 132a may be disposed on respective end surfaces of the ceramic body 110 in the length direction L, and the plating layers 131b, 131c, 132b, and 132c may be on the first electrode layers 131a and 132a.

Since the first electrode layers 131a and 132a are not formed by the dipping method according to the related art, the first electrode layers 131a and 132a may be formed on head surfaces corresponding to the end surfaces of the ceramic body 110 in the length direction L of the ceramic body 110, and may or may not be formed formed at sizes as small as possible on all of band surfaces corresponding to four surfaces contacting the head surfaces. Therefore, the external electrodes may be formed at thin and uniform thicknesses.

Therefore, formation areas of the internal electrodes may be increased, such that areas in which the internal electrodes overlap each other may be significantly increased, to implement a high capacitance multilayer ceramic capacitor.

According to the exemplary embodiment, the first electrode layers 131a and 132a may be formed by a sheet transfer method or a pad transfer method unlike the dipping method according to the related art.

Referring to FIGS. 5 and 6, it may be appreciated that the first electrode layers 131a and 132a are disposed to corner portions of the ceramic body 110 and are not formed on all of the band surfaces corresponding to the four surfaces contacting the head surfaces.

The first electrode layers 131a and 132a may be formed by transferring sheets including a conductive metal.

The first electrode layers 131a and 132a may be formed of the same conductive metal as that of the first and second internal electrodes 121 and 122, but are not limited thereto. For example, the first electrode layers 131a and 132a maybe formed of copper (Cu), silver (Ag), nickel (Ni), or alloys thereof.

The plating layers 131b, 131c, 132b, and 132c may be disposed on the first electrode layers 131a and 132a.

That is, the plating layers 131b, 131c, 132b, and 132c may be disposed on the head surfaces corresponding to the end surfaces of the ceramic body 110 in the length direction L of the ceramic body 110.

Particularly, the plating layers 131b, 131c, 132b, and 132c may be formed on the head surfaces corresponding to the end surfaces of the ceramic body 110 in the length direction L of the ceramic body 110, and may be omitted from both side surfaces of the ceramic body 110 in the width direction of the ceramic body 110 and the upper and lower surfaces of the ceramic body 110.

The plating layers 131b, 131c, 132b, and 132c may include nickel plating layers 131b and 132b and tin plating layers 131c and 132c each disposed on the nickel plating layers 131b and 132b, but are limited thereto.

According to the exemplary embodiment, the ratio of the thicknesses T2 and T1 satisfies the range $0.8 \leq T2/T1 \leq 1.2$ to reduce a deviation between the thicknesses T1 and T2 and thereby prevent deteriorations of reliability.

Where T2/T1 is less than 0.8 or exceeds 1.2, a deviation between thicknesses of the external electrodes is large, such that a plating solution may permeate into a thin portion of the external electrodes, thereby deteriorating reliability.

Contents overlapping those described above in relation to the method of manufacturing a multilayer ceramic electronic component have been omitted from this description of an exemplary embodiment of the multilayer ceramic electronic component.

As set forth above, in the multilayer ceramic electronic component according to the exemplary embodiment in the present disclosure, the external electrodes may have a thin and uniform thickness, and thus, formation areas of the internal electrodes may be increased, such that areas in which the internal electrodes overlap each other may be significantly increased, whereby a high capacitance multilayer ceramic capacitor may be implemented.

In addition, a deviation between thicknesses depending on positions of the external electrodes may be reduced, whereby a subminiature high capacitance multilayer ceramic capacitor having excellent reliability may be implemented.

While exemplary embodiments have been shown and described above, it will be apparent to those skilled in the art that modifications and variations could be made without departing from the scope of the present invention as defined by the appended claims.

What is claimed is:

1. A method of manufacturing a multilayer ceramic electronic component, comprising:
preparing an elastic punching material and a member having a sheet for forming an external electrode above the elastic punching material, the sheet comprising a conductive material;
stacking ceramic sheets to form a ceramic body, the ceramic sheets having internal electrode patterns formed on dielectric layers, the internal electrode patterns forming internal electrodes, the ceramic sheets being stacked such that internal electrodes are disposed to face each other with respective dielectric layers interposed therebetween;
pressing and adhering the ceramic body to the sheet to attach the sheet to a first end surface of the ceramic body; and
forming the external electrode on the first end surface of the ceramic body in a length direction by cutting the sheet using the elastic punching material.

2. The method of claim 1, further comprising:
attaching a release film to the elastic punching material; and
attaching the sheet to the release film.

3. The method of claim 2, wherein the release film is a polyethylene terephthalate (PET) film.

4. The method of claim 1, wherein forming the external electrode comprising forming the external electrode up to corner portions of the ceramic body.

5. The method of claim 1, further comprising, after forming the external electrode on the end surface of the ceramic body,
preparing a member having an elastic pressing material above a surface plate; and
heating the surface plate to thereby extend the external electrode to band portions of the ceramic body.

6. The method of claim 5, wherein the elastic pressing material is a pressing rubber.

7. The method of claim 5, wherein $0.4 \leq T3/T1 \leq 1.0$ in which T3 is a thickness of the external electrode in a corner portion of the ceramic body and T1 is a thickness of the external electrode in a central region of the ceramic body in a thickness direction.

8. The method of claim 1, wherein $0.8 \leq T2/T1 \leq 1.2$ in which T1 is a thickness of the external electrode in a central region of the ceramic body in a thickness direction and T2 is a thickness of the external electrode at a point at which an uppermost internal electrode in the thickness direction is positioned.

9. The method of claim 1, further comprising:
forming one or more plating layers on the external electrode.

10. The method of claim 1, wherein the elastic punching material is a punching rubber.

11. The method of claim 1, further comprising:
pressing and adhering the ceramic body to the sheet to attach the sheet for forming an external electrode to a second end surface of the ceramic body opposing the first end surface; and
forming a second external electrode on the second end surface of the ceramic body in a length direction, by cutting the sheet on the second end surface of the ceramic body using an elastic punching material.

12. The method of claim 11, further comprising:
preparing a second elastic punching material and a second member having a sheet above the second elastic punching material,
wherein the sheet attached to the second member is used as the sheet for forming an external electrode on the second end surface of the ceramic body, and
the second elastic punching material is the elastic punching material used for forming the second external electrode on the second end surface of the ceramic body.

13. The method of claim 11, wherein:
the sheet on the first end surface of the ceramic body is used as the sheet for forming an external electrode on the second end surface of the ceramic body, and
the elastic punching material used for forming the external electrode on the first end surface of the ceramic body is the elastic punching material used for forming the second external electrode on the second end surface of the ceramic body.

* * * * *